United States Patent [19]

Taylor

[11] Patent Number: 4,480,152
[45] Date of Patent: Oct. 30, 1984

[54] METHODS AND APPARATUS FOR PROTECTING LINE RELAY CONTACTS IN A TELEPHONE SWITCHING SYSTEM

[75] Inventor: Raymond G. Taylor, Shreveport, La.

[73] Assignee: Western Electric Company, Inc., New York, N.Y.

[21] Appl. No.: 352,748

[22] Filed: Feb. 26, 1982

[51] Int. Cl.³ .......................................... H04M 1/00
[52] U.S. Cl. ............................... 179/81 R; 179/99 H
[58] Field of Search ................... 179/99 H, 184, 81 R

[56] References Cited

U.S. PATENT DOCUMENTS

| Re. 29,078 | 12/1976 | Tate | 179/99 |
| Re. 29,884 | 1/1979 | Komine et al. | 179/2 DP |
| 3,549,820 | 12/1970 | Knollman | 179/99 |
| 3,733,442 | 5/1973 | Lee | 179/99 H |
| 3,895,192 | 7/1975 | Angner et al. | 179/81 R |
| 3,920,929 | 3/1974 | Tate | 179/99 |
| 3,985,959 | 10/1976 | Komine et al. | 179/2 DP |
| 3,996,426 | 12/1976 | Lancaster | 179/84 A |
| 4,088,846 | 5/1978 | McEowen | 179/99 H X |
| 4,351,987 | 9/1982 | Feil | 179/99 H |

FOREIGN PATENT DOCUMENTS 105413  8/1979  Japan ................. 179/99 H

Primary Examiner—Thomas W. Brown
Attorney, Agent, or Firm—J. J. Jordan

[57] ABSTRACT

Line relay contacts (LR1₁, LR1₂) are protected from power surges appearing on a telephone line (L1) during connect or disconnect of a station set (S1) from the line, by operating a hold relay (HR1) to place a hold bridge (HB1) across the line (L1) before energizing the line relay (LR1) to connect or disconnect the station set.

10 Claims, 2 Drawing Figures

METHODS AND APPARATUS FOR PROTECTING LINE RELAY CONTACTS IN A TELEPHONE SWITCHING SYSTEM

TECHNICAL FIELD

This invention relates to methods and apparatus for establishing connections between a telephone line and a station set in a telephone system and more particularly, to methods and apparatus for establishing connections to protect the relay contacts of a line relay.

BACKGROUND OF THE INVENTION

In telephone switching systems such as private branch exchanges (PBX's) and key telephone systems a small number of telephone lines interconnect a central office with a larger number of telephone stations in the system. For example, a PBX may have 30 lines servicing 100 telephone stations while a key system may have 2 lines servicing 12 stations. Each station in the system has associated with it a unique line relay per telephone line for connecting that station to the particular telephone line. In the 2 line 12 station key system mentioned above, each of the 12 station sets would have 2 line relays for switching each station to either of the two lines, for a total of 24 line relays in the system.

Since each system has numerous line relays it is expedient that relatively low cost relays be used in order to minimize system costs and to achieve that result, low cost reed relays are preferred as line relays. However, dry reed relays can experience contact damage from power surges appearing on the telephone line when the station set is connected or disconnected from the line, thus decreasing the life of the relays and adding to maintainence and repair costs for the system.

There is a need, therefore, for a circuit arrangement to protect the low cost line relays from surges appearing on the telephone line without adding additional costs to the telephone system.

SUMMARY OF THE INVENTION

This invention solves the above problem by methods and apparatus wherein a hold relay, already part of the telephone system, is signaled by sequencing means to initially interconnect a hold bridge with the selected telephone line to dissipate power surges appearing on the line. At a preselected time thereafter the line relay is operated and the hold relay is then disconnected, thereby saving wear on the line relay contacts.

Additionally, when the subscriber at a station set goes on-hook after completing a call, the hold relay associated with the telephone line is operated to interconnect the hold bridge between the line and the station set going on-hook. After the hold relay has been energized, the line relay is deenergized to disconnect the station set from the line, thus leaving only the hold bridge on the line to dissipate power surges appearing when disconnect occurs. Subsequently the hold relay is deenergized to release the line.

In a preferred embodiment, a microprocessor is used to generate sequencing signals to operate the hold and line relays in the proper timed sequence. A conventional microprocessor with appropriate software for controlling operation of the relays, is used.

DESCRIPTION OF THE DRAWINGS

Other features and advantages of the invention, its organization, construction, and operation will be best understood from the following detailed description of a specific embodiment thereof, taken in conjunction with the accompanying drawings in which.

Figure 1:
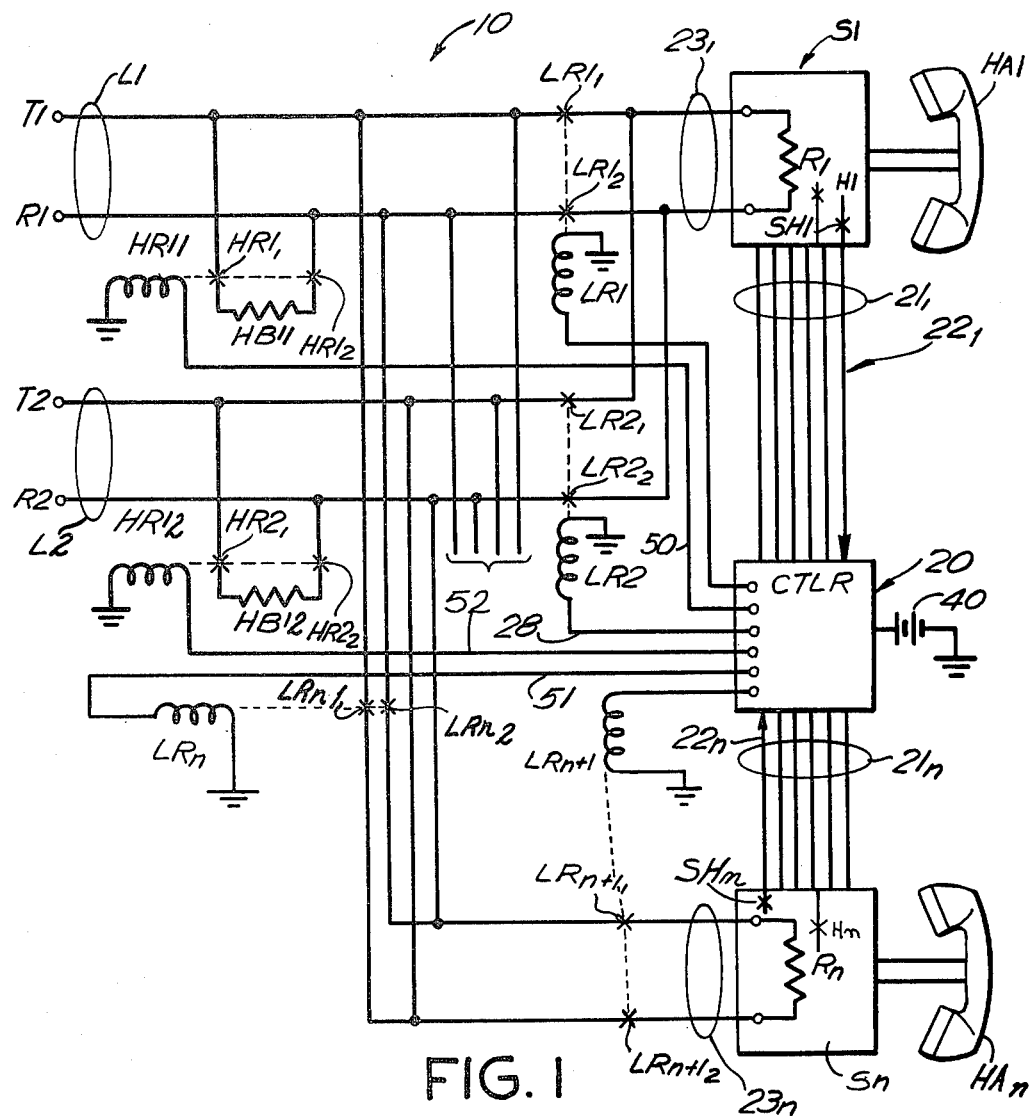
FIG. 1 is a circuit drawing of a key telephone system employing a specific embodiment of the present invention.

It will be noted that FIG. 1 employs a type of notation referred to as "detached contact" in which an "X" shown intersecting a conductor represents a normally open contact of a relay or key and a bar shown intersecting a conductor at right angles represents a normally closed contact of a relay or key, "normally" referring to the unoperated condition of the relay or key. The principles of this type of notation are described in an article entitled "An Improved Detached Contact Type Schematic Circuit Drawing" by F. T. Meyer in the September 1955 publication, Transactions of the American Institute of the Electrical Engineers, Part 1, Communications and Electronics, Vol. 74, pages 505-513.

DETAILED DESCRIPTION

FIG. 1 shows a typical key telephone system 10 comprising a plurality of station sets, S1 through Sn, each of which can be interconnected to either of the two telephone lines L1 or L2 having a single pair of tip T and ring R leads. Individual station sets, such as station set S1, comprise a handset HA1, which when lifted by a subscriber at station set $S_1$ operates to close switchhook contact SH1. Station set S1 is interconnected to a controller 20 by means of a three pair cable $21_1$, one of which leads $22_1$ is connected to switchhook SH1 such that when switchhook SH1 operates, a signal is sent from station set S1 to controller 20 over lead 22. Telephone line L1 or L2 can be connected to station set S1 by operation of a particular line relay LR1 or LR2 to interconnect line L1 or L2 to single pair cable $23_1$ which is terminated by resistor $R_1$ at the station set S1. Resistor $R_1$ is typically 200 ohms for providing balancing between station set S1 and an interconnected telephone line.

NORMAL OPERATION

(a) Line Relays

Each station set has associated with it a unique set of line relays LR1-LR2, LRn-LRn+1 one of which operates to connect the associated station set with a particular telephone line. For instance, when line relay LR2 operates, relay contacts LR2hd 1 and $LR2_2$ are closed, thereby connecting the tip T2 and ring R2 leads of telephone line L2 with cable pair $23_1$ to connect station set S1 with telephone line L2. Each line relay is connected to controller 20 by means of an individual lead such that control signals can be transmitted from controller 20 to operate selected line relays.

Thus when a subscriber in a typical key telephone system 10 wishes to place a telephone call from station set Sn to the telephone central office over either of the two telephone lines L1 or L2, handset HAn is picked up, thereby closing switchhook SHn to signal controller 20 that station set Sn is off-hook. Controller 20, which has been programmed in a conventional manner to select one of the lines L1 or L2 for use, a preselected one, line L1, if both are idle, causes line relay LRn to operate by interconnecting lead 51 with battery 40, causing current to flow through relay LRn to ground. Operation of line relay LRn closes normally open relay contact points LRN1 and LRN2 thereby interconnecting the tip T1 and Ring R1 of line L1 with cable 23n terminated at station set Sn.

When line relay LRn operates to close contact points LRn$_1$ and LRn$_2$ to connect station set Sn with line L1, a power surge flows from the central office down line L1 toward station Sn and closed contact points LRn$_1$ and LRn$_2$. Central office voltage appearing on line L1 is typically 48 volts and immediately after closing contact points LRn$_1$ and LRn$_2$, a surge current of up to one amp can appear on line L1, damaging contacts LRn$_1$ and LRN$_2$.

(b) Hold Relays

System 10 also comprises two hold relays HR1 and HR2 which are associated with the two telephone lines L1 and L2 respectively. Hold relays HR1 and HR2 are typically heavy duty mercury relays such as the 355A relay manufactured by the Western Electric Co., Inc. of New York, N.Y. Mercury relays have mercury wetted contacts which can readily withstand power surges when the station sets S1—Sn are connected to or disconnected from a telephone line during a hold sequence.

A hold relay is typically energized when a subscriber, involved with an existing call at a station set, and wishing to place another call, pushes the hold button H on the station set to place the existing call on hold. For instance, when a subscriber at station set S1 wishes to place an existing call on line L1 on hold, hold button H1 is depressed, thereby signaling controller 20 over cable 21$_1$ that the subscriber at station set S1 wishes to place the existing call on hold. As seen in FIG. 1, each hold relay can be selectively energized by controller 20 by connecting the particular hold relay with the battery. In the example described above, controller 20 connects battery 40 to lead 50, thereby allowing current to flow through lead 50, hold relay HR1, to ground. Hold relay HR1 is energized, thereby closing normally open contacts HR1$_1$ and HR1$_2$ and placing hold bridge HB1 across the tip T1 and ring R1 leads of telephone line L1 in parallel with station set S1. After hold relay HR1 is energized to place the call on line L1 on "hold", controller 20 releases line relay LR1, thereby disconnecting station set S1 from line L1 and now permitting the subscriber on station set S1 to place a new call on line L2.

Controller 20

Controller 20 can be any electromechanical sequencing circuit or a solid state sequencing circuit comprising hardware and software. In the embodiment described herein, controller 20 is a microprocessor.

Obviously, the specific details of the controller 20, preferably an integrated circuit of the type referred to as a "microprocessor" or "microcomputer" chip in modern parlance, are not important to the practice of the invention. In the embodiment of the invention illustrated, the controller 20 can be any known type of switching circuitry that is capable of responding to a binary input from station sets S1—Sn to operate any one of the line relays such as LR1—LRn+1 and one of the hold relays HR1 or HR2 as described above, such as the Texas Instruments TMS-1000 family of microcomputer chips.

Preferably also, the controller 20 performs numerous other functions in the operation of the telephone set to provide an assortment of features, including the loop current sensing and current-initialization functions.

In a specific example, the controller is a CMOS "single-chip microcomputer", as generally described in an article "MAC-4: A Single-Chip Microcomputer", by W. F. Chow and W. W. Troutman, the *Bell System Technical Journal*, Vol. 58, No 4 pp. 959–962 (April, 1979). This is a versatile, low power microcomputer chip that can be used as a controller for various functions in a telephone set, including the switching functions described in this application, and can be driven solely from the central office input signals, without the use of auxiliary power sources. Further details of the MAC-4 microcomputer and operation may be obtained from the following issued patents, herein incorporated by reference:

(1) U.S.Pat. No. 4,293,907 issued Oct. 6, 1981 to V. K. Huang and R. L. Ruth entitled "Data Processing Apparatus Having Opcode Extension Register";

(2) U.S. Pat. No. 4,258,914 issued Mar. 24, 1981 to D. L. Blahut, D. H. Copp and D. C. Stanzione entitled "Data Processing Appratus Providing Variable Oper- and Width Operation";

(3) U.S. Pat. No. 4,250,545 issued Feb. 10, 1981 to D. E. Blahut, D. H. Coop and D. C. Stanzione, entitled "Data Processing Apparatus Providing Autoloading of Memory Pointer Registers";

(4) U.S. Pat. No. 4,240,142 issued Dec. 16, 1980 to D. E. Blahut, D. H. Copp and D. C. Stanzione, entitled "Data Processing Apparatus Providing Autoincrementing of Memory Point ER Registers";

(5) U.S. Pat. No. 4,346,437 issued Aug. 24, 1982 to D. E. Blahut and R. L. Ukeiley entitled "Microcomputer Using a Double Opcode Instruction";

(6) U.S. Pat. No. 4,348,720 issued Sept. 7, 1982 to D. E. Blahut, V. K. Huang and R. L. Townsend, Jr. entitled "Microcomputer Arranged for Direct Memory Access";

(7) U.S. Pat. No. 4,306,287 issued Dec. 15, 1981 to V. K. Huang, entitled "Special Address Generation Arrangement".

OPERATION OF THE SYSTEM TO PROTECT THE LINE RELAY CONTACTS

When handset HA$_1$ of station set S1 is first taken off-hook, switchhook contact SH1 is closed and provides an input signal on lead 22$_1$, to controller 20, informing the controller that station set S1 is now off-hook. Controller 20, which has been programmed in a conventional manner to perform a set routine of tasks, first checks to see if the telephone lines L1 and L2 are idle. If both are idle a predetermined one of the telephone lines is selected, say line L2. If both are busy, controller 20 arranges to return a busy signal to station set S1 by conventional circuity not shown herein. Upon selection of line L2 controller 20 arranges to connect battery 40 to lead 52 such that current flows through lead 52, hold relay HR2 to ground. Hold relay HR2 is now energized and normally open relay contacts HR2$_1$ HR2$_2$ close, thereby placing hold bridge HB2 across the tip T2 and ring R2 leads of line L2.

Figure 2:
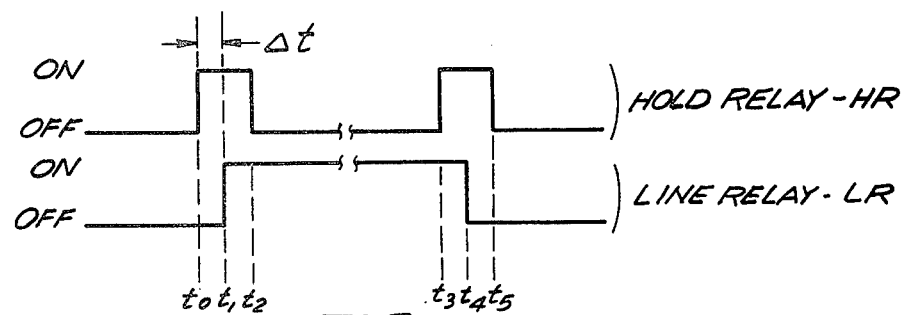
FIG. 2 is a time sequence chart slowing the timing required for the opertion of the hold and line relays.

FIG. 2 is a time sequence drawing representing the ON-OFF status of a hold relay and line relay during the operation of the sequence to protect the line relay contacts. At time t$_o$, controller 20 energizes hold relay HR2 to place hold brdige HB2 across telephone line L2.

When hold bridge HB2 terminates line L2, an input line voltage appearing on line L2 from the central office is 48 volts, causing an initial current surge of approximately one amp to be encountered and absorbed by relay contacts $HR2_1$, $HR2_2$ and bridge HB2.

After a predetermined time, for example twice the operate time of the hold relay (typically 5 milliseconds), represented by the time $T_0$ to $t_1$, ($\Delta t$) in FIG. 2, during which time the current on line L2 increases to approximately 20-150 milliamps, controller 20 causes line relay LR2 to operate by connecting battery to lead 28. Operation of line relay LR2 causes normally open relay contacts $LR2_1$, $LR2_2$ to close, thereby interconnecting station set S1 through cable $23_1$ and closed contacts $LR2_1$, $LR2_2$ to tip T2 and ring R2 leads of line L2 with interconnected bridge HB2 arranged in parallel with station set S1. Promptly thereafter, at time t2 of FIG. 2, controller 20 removes battery 40 from lead 52, thereby deenergizing hold relay HR2, opening contacts $HR2_1$ and $HR2_2$ and removing hold bridge HB2 from line L2 to allow station set S1 to be connected in a normal manner to line L2.

When the subscriber at station set S1 terminates the call by placing handset $HA_1$ on-hook, switch hook contact SH1 is opened and controller 20 is signalled over lead 22, that station set S1 is on-hook. Controller 20 again connects battery 40 to lead 52 to energize hold relay HR2 such that relay contacts $HR2_1$, $HR2_2$ close to place hold bridge HB2 across the tip T2 and ring R2 leads of line L2 as seen in FIG. 1. This occurs at time t3 of FIG. 2. Promptly thereafter, at time t4, controller 20 removes battery from lead 28 thereby turning off line relay LR2, causing normally open relay contacts $LR2_1$, $LR2_2$ to open, thereby disconnecting station set S1 from the tip T2 and ring R2 leads of line L2. Thus when station set S1 is disconnected from line L2, hold bridge HB2 is connected across line L2 and whatever power surge appearing on line L2 because of the disconnect is absorbed by hold bridge HB2 and hold relay contacts $HR2_1$ and $HR2_2$. Thus the sequencing of the two heavy duty hold relays HR1 and HR2 (required in the system to provide conventional hold functions) protects the plurality of line relays against power surges on the line and thereby allows for the production of a lower cost switching system with less expensive line relays, and provides longer contact life for a given quality of line relay at no extra cost for additional apparatus except for changed software included in controller 20.

While one specific embodiment of the invention has been described in detail herein, it should be obvious that various modifications, such as the use of known relay sequencing circuits instead of a microprocessor as controller 20, may be made from the specific details described, without departing from the spirit and scope of the invention.

What is claimed is:

1. A method of protecting line relay contacts from power surges appearing on a telephone line wherein a line relay is signaled to open or close its line relay contacts to connect or disconnect the telephone line with a particular station set, the telephone line having a hold relay associated with the line, the method comprising the step of:
    energizing a hold relay associated with the telephone line to place a hold bridge across the line at a time prior to signaling the line relay to open or close the line relay contacts on the telephone line.

2. The method as recited in claim 1 comprising the additional step of:
    signaling the line relay to open or close the line relay contacts at a time after power surges appearing on the telephone line have been dissipated by the hold bridge.

3. The method as recited in claim 2 comprising the additional step of:
    deenergizing the hold relay after the line has been signaled.

4. A method of establishing connections between a station set and a telephone line in a telephone system to protect relay contacts of a line relay associated with the station set from power surges appearing on the telephone line, comprising the steps of:
    (1) signaling a hold relay, associated with the telephone line which is to be connected to the station set, to operate to interconnect a hold bridge across the telephone line;
    (2) signaling the line relay associated with the station set to operate to close the line relay contacts to interconnect the station set with the telephone line in parallel with the connected hold bridge; and
    (3) signaling the hold relay to disconnect the hold bridge from the telephone line.

5. The method as recited in claim 4 wherein the signaling of the hold relay step comprises:
    passing current through the hold relay to cause the relay to operate; and
    closing the hold relay contacts to interconnect a hold bridge comprising a resistor across the telephone line to dissipate any power surges appearing on the telephone line prior to operation of the line relay.

6. The method as recited in claim 4 wherein the signals occuring during the signaling steps are generated by a sequencing circuit.

7. A method for disconnecting a station set from a telephone line in a telephone system to protect relay contacts of a line relay associated with the station set from power surges appearing on the line during disconnect, comprising the steps of:
    (1) operating a hold relay associated with the telephone line to interconnect a hold bridge across the telephone line in parallel with the connected station set;
    (2) releasing the line relay to open the line relay contacts to disconnect the station set from the telephone line.

8. The method as recited in claim 7 comprising the additional step of:
    releasing the hold, relay after the line relay has been released, to return the telephone line to an idle condition.

9. Apparatus for protecting line relay contacts from power surges appearing on a telephone line when a line relay is signaled to open or close its line relay contacts to connect or disconnect the telephone line with a subscriber's station set, comprising:
    a hold relay having hold relay contacts which, when the hold relay is signaled, operate to place a hold bridge across the telephone line; and
    sequencing means for signaling the hold relay and the line relay such that the hold relay is signaled to operate the hold relay contacts to place the hold bridge across the telephone line to dissipate current surges appearing on the line prior to signaling the line relay to open or close its line relay contacts.

10. Apparatus as recited in claim 9 wherein the hold bridge comprises a resistor element.

* * * * *